Patented Apr. 6, 1954

2,674,606

UNITED STATES PATENT OFFICE 2,674,606

4-HALO-11β,17α-DIHYDROXYPREGNANE-3-20-DIONES

Robert H. Levin, Kalamazoo Township, Kalamazoo County, and Barney J. Magerlein, Kalamazoo, Mich., assignors to The Upjohn Company, Kalamazoo, Mich., a corporation of Michigan No Drawing. Application October 27, 1952, Serial No. 317,159

3 Claims. (Cl. 260—397.45)

The present invention relates to the synthesis of certain steroid compounds, and is more particularly concerned with the novel compounds, 4-halo-11β,17α-dihydroxypregnane-3,20-diones.

The novel compounds of the present invention may be represented by the following structural formula:

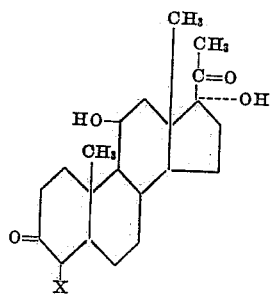

wherein X is a halogen of atomic weight from 35 to 80 and is selected from chlorine and bromine.

The process of the present invention involves reacting 11β,17α-dihydroxypregnane-3,20 - dione with a halogenating agent such as, for example, chlorine or bromine in an organic solvent, such as dimethylformamide, dimethylacetamide or other dialkylacylamides, acetic acid, methylenedichloride, chloroform, carbon tetrachloride and other solvents.

It is an object of the present invention to provide the novel compounds, 4-halo-11β,17α-dihydroxypregnane - 3,20 - diones. Other objects of the invention will be apparent to one skilled in the art to which this invention pertains.

The novel compounds of the present invention have utility as stable, solid intermediates for the preparation of physiologically active substances such as, for example, Kendall's Compound "F" acetate (11β,17α - dihydroxy-21-acetoxy-4-pregnene-3,20-dione) and the new compound 11β,17α-dihydroxy-4-pregnene-3,20-dione. For this purpose 4 - halo - 11β,17α - dihydroxypregnane-3,20-dione is treated with semicarbazide followed by pyruvic acid. The thus-obtained 11β,17α-dihydroxy-4-pregnene-3,20-dione when reacted with lead tetraacetate is productive of Kendall's Compound "F" acetate. 11β,17α-dihydroxy-4-pregnene-3,20-dione has a pronounced inhibiting effect on the secretion of adrenocorticotrophic hormone (ACTH) and therefore is of value in the treatment of diseases where oversecretion of ACTH and adrenal hormones occurs, for example in adrenal hyperplasia and pituitary basophilism (Cushing's disease).

The starting compound for the present invention is 11β,17α - dihydroxypregnane-3,20-dione, which is prepared by reacting 17α-hydroxypregnane-3,11,20-trione with an alkanediol, preferably a lower-alkane-1,2-diol or lower-alkane-1,3-diol, in the presence of an acid catalyst, reducing the thus-obtained 17α-hydroxypregnane-3,11,20-trione, 3,20-cyclic diketal with a reducing agent, such as lithium aluminum hydride, sodium borohydride or hydrogen in the presence of a catalyst, and hydrolyzing the thus-obtained 11β,17α-dihydroxypregnane-3,20-dione, 3,20 - diketal with a strong acid to obtain the 11β,17α-dihydroxypregnane-3,20-dione.

In carrying out the process of the present invention, 11β,17α - dihydroxypregnane-3,20-dione is dissolved in an organic solvent, such as, for example, acetic acid, methylene dichloride, chloroform, carbon tetrachloride, tertiary butyl alcohol, N,N-dimethylformamide, N,N-dimethylacetamide or other N,N-dialkylacylamides, with acetic acid being preferred, and to this solution is added the halogen, either as such or as a solution in the same solvent. The product is isolated by pouring the reaction mixture into a cooled sodium chloride solution and separating the thus-precipitated product from the solution by filtration. The halogenation is conveniently conducted at room temperature, but temperatures of about zero to about 100 degrees centigrade are operative, with a temperature of about zero to about forty degrees centigrade being preferred. The halogen may be added in one portion, but preferably the addition is dropwise in order to avoid any large excess of the halogen in the reaction mixture. In this way each drop is added as soon as the previous drop has reacted as indicated by the loss of color. Consequently, the reaction period is wholly dependent on the reactivity of the steroid and the amount of halogen employed. Reaction periods of a few minutes to several hours are operative. The preferred molar ratio of 11β,17α-dihydroxypregnane-3,20-dione to halogen is one mole of the steroid to about 1.0 to 1.3 moles of the halogen. If a smaller amount of halogen is used, it will be insufficient to complete the halogenation, whereas if much more than 1.3 moles of halogen to one mole of steriod is used, undesirable polyhalogenated products may be formed. Sometimes an acid catalyst is added to the reaction mixture to initiate or to speed up the reaction. For this purpose solutions of hydrobromic acid in acetic acid, para-toluenesulfonic acid, naphthalenesulfonic acid or other like compounds may be used.

The following examples illustrate the process and products of the present invention, but are not to be construed as limiting.

PREPARATION 1.—17α-HYDROXYPREGNANE-3,11,20-TRIONE, 3,20-ETHYLENE GLYCOL DIKETAL

A solution of 700 milligrams of 17α-hydroxypregnane-3,11,20-trione, five milliliters of pre-distilled ethylene glycol, fifty milligrams of para-toluenesulfonic acid monohydrate and 150 milliliters of benzene was placed in a reaction flask equipped with a reflux condenser and a water trap. The mixture was heated under reflux with stirring for ten hours. Water which formed was removed by co-distillation with benzene and was collected in the water trap. The reaction mixture was cooled, washed with fifty milliliters of dilute sodium bicarbonate solution and with water, and then dried and concentrated to dryness under reduced pressure. The white crystalline residue was recrystallized repeatedly from ethyl acetate-Skellysolve B solution to yield about 600 milligrams of 17α-hydroxypregnane-3,11,20-trione, 3,20-ethylene glycol diketal of melting point 185–186 degrees centigrade.

*Analysis.*—Calculated for $C_{25}H_{38}O_6$: C, 69.09; H, 8.81. Found: C, 69.01; H, 9.02.

Infrared analysis confirmed the postulated structure for 17α-hydroxypregnane-3,11,20-trione, 3,20 ethylene glycol diketal.

PREPARATION 2.—17α-HYDROXYPREGNANE-3,11,20-TRIONE, 3,20-PROPYLENE GLYCOL DIKETAL

A solution of 0.50 gram of 17α-hydroxypregnane-3,11,20-trione, five milliliters of propylene glycol and fifty milligrams of ortho-chlorobenzenesulfonic acid, dissolved in one hundred milliliters of toluene, is heated under reflux for ten hours, while the water which is formed in the reaction is removed by co-distillation with toluene. The cooled solution is neutralized with sodium bicarbonate, washed with water, dried and concentrated to dryness in vacuo. The crystals of 17α-hydroxypregnane-3,11,20-trione, 3,20-propylene glycol diketal are recrystallized from ethyl acetate.

PREPARATION 3.—17α-HYDROXYPREGNANE-3,11,20-TRIONE, 3,20-PROPANE-1,3-DIOL DIKETAL

In essentially the same manner as shown in Preparation 1, 17α-hydroxypregnane-3,11,20-trione, 3,20-propane-1,3-diol diketal is prepared by heating 17α-hydroxypregnane-3,11,20-trione with propane-1,3-diol dissolved in benzene with para-toluenesulfonic acid as catalyst.

In the same manner as described in Preparations 1 through 3, inclusive, by reacting 17α-hydroxypregnane-3,11,20-trione with an alkanediol, preferably an alkane-1,2-diol or an alkane-1,3-diol, in the presence of an acid catalyst in solution, the following compounds may be obtained: 17α - hydroxypregnane - 3,11,20-trione, 3,20-butane-1,2-diol diketal, 17α-hydroxypregnane-3,11,20-trione, 3,20-butane-1,3-diol diketal, 17α - hydroxypregnane - 3,11,20-trione, 3,20-butane - 2,3 - diol diketal, 17α-hydroxypregnane-3,11,20-trione, 3,20-pentane-1,2-diol diketal, 17α-hydroxypregnane - 3,11,20-trione, 3,20-pentane-1,3-diol diketal, 17α-hydroxypregnane-3,11,20-trione, 3,20-hexane-1,2-diol diketal, 17α-hydroxypregnane - 3,11,20 - trione, 3,20-hexane-1,3-diol diketal, 17α - hydroxypregnane - 3,11,20-trione, 3,20-heptane-1,2-diol diketal, 17α-hydroxypregnane-3,11,20-trione, 3,20-heptane-1,3-diol diketal, 17α-hydroxypregnane-3,11,20-trione, 3,20-octane-1,2-diol diketal, 17α-hydroxypregnane-3,11,20-trione, 3,20-octane-1,3-diol diketal, and other like diketals.

PREPARATION 4.—11β,17α-DIHYDROXYPREGNANE-3,20-DIONE, 3,20-ETHYLENE GLYCOL DIKETAL

To a solution of five grams of lithium aluminum hydride, dissolved in 600 milliliters of anhydrous ether, was added 29.5 grams of 17α-hydroxypregnane - 3,11,20-trione, 3,20-ethylene glycol diketal dissolved in one hundred milliliters of ether and one hundred milliliters of benzene. The resulting mixture was stirred for one hour at room temperature after which time it was refluxed for another hour and then cooled and hydrolyzed with fifty milliliters of water. The organic layer was separated by decantation and the remaining paste was suspended in water and repeatedly extracted with methylene dichloride. The combined ether and methylene dichloride solutions were concentrated to give a quantitative yield of crystalline 11β,17α-dihydroxypregnane-3,20-dione, 3,20-ethylene glycol diketal. Infrared analysis confirmed the postulated structure for 11β,17α-dihydroxypregnane-3,20-dione, 3,20-ethylene glycol diketal.

PREPARATION 5.—11β,17α-DIHYDROXYPREGNANE-3,20-DIONE, 3,20-PROPYLENE GLYCOL DIKETAL

To a solution of one gram of lithium aluminum hydride, dissolved in 75 milliliters of ether, was added one gram of 17α-hydroxypregnane-3-11,20-trione, 3,20-propylene glycol diketal dissolved in 20 milliliters of benzene. The mixture was stirred for one hour at room temperature after which time it was refluxed for another hour and then cooled and hydrolyzed with the addition of water. The organic layer was separated, washed with water, dried, and concentrated to dryness to give 11β,17α-dihydroxypregnane-3,20-dione, 3,20-propylene glycol diketal.

PREPARATION 6.—11β,17α-DIHYDROXYPREGNANE-3,20-DIONE, 3,20-PROPANE-1,3-DIOL DIKETAL

Following the procedure given in Preparation 4, 11β,17α-dihydroxypregnane-3,20-dione, 3,20-propane-1,3-diol diketal is prepared using 17α-hydroxypregnane - 3,11,20-trione, 3,20-propane-1,3-diol diketal from Preparation 3 instead of 17α - hydroxypregnane-3,11,20-trione, 3,20-ethylene glycol diketal.

In the same manner as described in Preparations 4 through 6, inclusive, by reacting a selected 17α-hydroxypregnane-3,11,20-trione, 3,20-alkanediol diketal with a reducing agent such as, for example, lithium aluminum hydride, lithium borohydride, sodium borohydride, hydrogen in the presence of catalysts such as Raney nickel, platinum and other like catalysts in solution, the following representative compounds may be obtained: 11β,17α-dihydroxypregnane-3,20-dione, 3,20-butane-1,3-diol diketal, 11β,17α-dihydroxypregnane-3,20-dione, 3,20-butane 2,3-diol diketal, 11β,17α-dihydroxypregnane-3,20-dione, 3,20-pentane-1,2-diol diketal, 11β,17α-dihydroxypregnane-3,20-dione, 3,20-hexane-1,2-diol diketal, 11β,17α-dihydroxypregnane-3,20-dione, 3,20-heptane - 1,2-diol diketal, 11β,17α-dihydroxypregnane-3,20-dione, 3,20-octane-1,2-diol diketal, 11β,17α - dihydroxypregnane-3,20-dione, 3,20-butane-1,3-diol diketal, 11β,17α-dihydroxypregnane-3,20-dione, 3,20-pentane-1,3-diol diketal, 11β,17α-dihydroxypregnane-3,20-dione, 3,20-hexane-1,3-diol diketal, 11β,17α-dihydroxypregnane-3,20-dione, 3,20-heptane-1,3-diol diketal, 11β,17α- dihydroxypregnane-3,20-dione, 3,20-octane-1,3-diol diketal, and other like cyclic diketals.

PREPARATION 7.—11β,17α-DIHYDROXYPREGNANE-3,20-DIONE

Twenty-nine and one-half grams of 11β,17α-dihydroxypregnane - 3,20 - dione, 3,20 - ethylene glycol diketal was dissolved in 600 milliliters of acetone and a solution of four milliliters of sulfuric acid in one hundred milliliters of water was added thereto. The solution thus-obtained was allowed to stand at room temperature during a period of sixteen hours, after which time the acid was neutralized with sodium bicarbonate and the acetone distilled off in vacuo. The remaining aqueous suspension was filtered and the crystalline precipitate was washed with water and dried. The crude yield was 19.5 grams (32.7 percent). After recrystallization of this material from 200 milliliters of ethyl acetate, 14.04 grams (46.7 percent) of 11β,17α-dihydroxypregnane-3,20-dione of melting point 213 to 221 degrees centigrade was obtained.

PREPARATION 8.—11β,17α-DIHYDROXYPREGNANE-3,20-DIONE

One gram of 17α-hydroxypregnane-3,11,20-trione, 3,20-ethylene glycol diketal, dissolved in 20 milliliters of anhydrous benzene, was added to a solution of one gram of lithium aluminum hydride in 75 milliliters of anhydrous ether. The reaction mixture was stirred for one hour at room temperature and heated under reflux for one hour. Without isolation of the intermediate 11β,17α - dihydroxypregnane - 3,20-dione, 3,20-ethylene glycol diketal, the lithium aluminum complex of the diketal was hydrolyzed to give 11β,17α - dihydroxypregnane-3,20-dione by the slow addition of one hundred milliliters of dilute hydrochloric acid (fifty percent) and stirring of the acid mixture for a period of sixteen hours at room temperature. The organic layer was separated and the acidic solution extracted repeatedly with 25-milliliter portions of ether. The combined washings and organic layer are washed with sodium bicarbonate and water, and then dried over anhydrous sodium sulfate. 11β,17α-dihydroxypregnane-3,20-dione was recrystallized from ethyl acetate and had a melting point of 208 to 212 degrees centigrade.

Analysis.—Calculated for $C_{21}H_{32}O_4$: C, 72.38; H, 9.26. Found: C, 72.51; H, 9.09.

PREPARATION 9.—11β,17α-DIHYDROXYPREGNANE-3,20-DIONE

Following the procedure given in Preparation 7, 11β,17α-dihydroxypregnane-3,20-dione, 3,20-propylene glycol diketal is hydrolyzed in acetone solution with dilute sulfuric acid to produce 11β,17α-dihydroxypregnane-3,20-dione.

Alternatively 11β,17α-dihydroxypregnane-3,20-dione may be obtained from 17α-hydroxypregnane-3,11,20-trione, 3,20-propylene glycol diketal by reduction of the diketal with lithium aluminum hydride and hydrolysis of the lithium aluminum complex with hydrochloric acid in the manner of Preparation 8.

PREPARATION 10.—11β,17α-DIHYDROXYPREGNANE-3,20-DIONE

Following the procedure described in Preparation 7, 11β,17α-dihydroxypregnane-3,20-dione is prepared by hydrolyzing 11β,17α-dihydroxypregnane-3,20-dione, 3,20-propane-1,3-diol diketal, instead of 11β,17α-dihydroxypregnane-3,20-dione, 3,20-ethylene glycol diketal, in acetone and aqueous sulfuric acid.

Alternatively, 11β,17α-dihydroxypregnane-3,20-dione may be obtained from 17α-hydroxypregnane - 3,11,20 - trione, 3,20-propane-1,3-diol diketal by reduction of the diketal with lithium aluminum hydride and hydrolysis of the lithium aluminum complex with hydrochloric or sulfuric acid in the manner of Preparation 8.

In the manner shown in Preparations 7 through 10, 11β,17α - dihydroxypregnane-3,20-dione can be obtained by hydrolyzing with mineral or strong organic acids the following 11β,17α - dihydroxypregnane - 3,20 - dione, 3,20-cyclic ketals or the 11β-lithium aluminum complexes thereof: 11β,17α-dihydroxypregnane-3,20-dione, 3,20-butane-1,2-diol diketal, 11β,17α-dihydroxypregnane - 3,20-dione, 3,20-butane-2,3-diol diketal, 11β,17α-dihydroxypregnane-3,20-dione, 3,20 - butane-1,3-diol diketal, 11β,17α-dihydroxypregnane-3,20-dione, 3,20-pentane-1,2-diol diketal, 11β,17α - dihydroxypregnane - 3,20 - dione, 3,20-pentane-1,3-diol diketal, 11β,17α-dihydroxypregnane - 3,20-dione, 3,20-hexane-1,2-diol diketal, 11β,17α - dihydroxypregnane - 3,20-dione, 3,20-hexane-1,3-diol diketal, 11β,17α-dihydroxypregnane-3,20-dione, 3,20-heptane-1,2-diol diketal, 11β,17α - dihydroxypregnane - 3,20 - dione, 3,20-heptane-1,3-diol diketal, 11β,17α-dihydroxypregnane-3,20-dione, 3,20-octane-1,2-diol diketal, 11β,17α - dihydroxypregnane-3,20-dione, 3,20-octane-1,3-diol diketal, and other like cyclic diketals.

Example 1.—4-bromo-11β,17α-dihydroxypregnane-3,20-dione

A solution of three grams of 11β,17α-dihydroxypregnane-3,20-dione was dissolved in fifty milliliters of acetic acid and thereto 29.2 milliliters of a solution of bromine in acetic acid containing 0.3096 gram of bromine and 0.0275 gram of sodium acetate per milliliter was added under vigorous stirring. The reaction was initiated by one drop of a solution of hydrobromic acid in acetic acid. The rate of addition was adjusted so that decolorization was achieved after each drop of bromine solution was added. At the completion of the reaction, which required 25 minutes, the solution was poured into 900 milliliters of a saturated sodium chloride solution. The crude 4-bromo-11β,17α-dihydroxypregnane-3,20-dione, separated by filtration, weighed 3.18 grams and had a melting point of 195–197 degrees centigrade after it had been recrystallized from acetone. Infrared analysis confirmed the postulated structure for 4-bromo-11β,17α-dihydroxypregnane-3,20-dione.

Analysis. — Calculated for $C_{21}H_{31}O_4Br$: C, 59.01; H, 7.31; Br, 18.70. Found: C, 59.15; H, 7.46; Br, 18.30.

Example 2.—4-bromo-11β,17α-dihydroxypregnane-3,20-dione

A solution of 320 milligrams (2.0 millimoles) of bromine in 3.2 milliliters of dimethylformamide was added dropwise to a solution of 716 milligrams (2.0 millimoles) of 11β,17α-dihydroxypregnane-3,20-dione and sixteen milligrams of para-toluenesulfonic acid in 6.8 milliliters of dimethylformamide at room temperature. The reaction mixture was stirred during the addition which required about three hours. After completion of the reaction, water was added and the precipitated 4-bromo-11β,17α-dihydroxypregnane-3,20-dione was separated by filtration, washed and recrystallized from acetone.

Infrared analysis confirmed the identity of the compound.

Example 3.—4-chloro-11β,17α-dihydroxy-pregnane-3,20-dione

11β,17α - dihydroxypregnane - 3,20 - dione (0.001 mole; 0.358 gram) was dissolved in five milliliters of dimethylformamide and a few crystals of para-toluenesulfonic acid were added thereto. A chlorine solution was prepared by bubbling about 0.9 gram of gaseous chlorine into 25 milliliters of ice-cold dimethylformamide, resulting in a chlorine concentration, as determined by titration, of 1.04 N. To the solution containing the steroid, while being stirred, was added dropwise 2.3 milliliters (0.00120 mole) of the chlorine solution. Each drop was allowed to decolorize before the next was added. The reaction mixture was then diluted with fifty milliliters of water and cooled. The precipitate which was formed was collected, washed with water, and dried. Infrared analysis confirmed the postulated structure for 4-chloro-11β,17α-dihydroxy-pregnane-3,20-dione.

It is to be understood that the invention is not to be limited to the exact details of operation or exact compounds shown and described as obvious modifications and equivalents will be apparent to one skilled in the art, and the invention is therefore to be limited only by the scope of the appended claims.

We claim:

1. A 4 - halo - 11β,17α - dihydroxypregnane-3,20-dione wherein the halogen atom in position 4 has an atomic weight between 35 and 80.

2. 4 - bromo - 11β,17α - dihydroxypregnane-3,20-dione.

3. 4 - chloro - 11β,17α - dihydroxypregnane-3,20-dione.

No references cited.